United States Patent
Wei

(10) Patent No.: US 11,453,604 B2
(45) Date of Patent: Sep. 27, 2022

(54) SWIMMING POOL FILTER INCLUDING AN ANTI-PATHOGENIC DOSING ELEMENT CAPABLE OF AUTOMATICALLY DOSING

(71) Applicant: TIANJIN YUNDA INDUSTRY AND TRADE CO., LTD, Tianjin (CN)

(72) Inventor: Enyu Wei, Tianjin (CN)

(73) Assignee: Tianjin Yunda Industry and Trade Co., LTD., Tianjin (CN)

( * ) Notice: Subject to any disclaimer, the term of this patent is extended or adjusted under 35 U.S.C. 154(b) by 0 days.

(21) Appl. No.: 17/203,206

(22) Filed: Mar. 16, 2021

(65) Prior Publication Data

US 2022/0127170 A1 Apr. 28, 2022

(30) Foreign Application Priority Data

Oct. 28, 2020 (CN) .......................... 202011172603.1

(51) Int. Cl.
| | |
|---|---|
| C02F 1/68 | (2006.01) |
| B01D 29/33 | (2006.01) |
| C02F 1/00 | (2006.01) |
| E04H 4/12 | (2006.01) |
| C02F 103/42 | (2006.01) |

(52) U.S. Cl.
CPC ............ *C02F 1/688* (2013.01); *B01D 29/333* (2013.01); *C02F 1/001* (2013.01); *E04H 4/1218* (2013.01); *E04H 4/1281* (2013.01); *B01D 2201/291* (2013.01); *C02F 2103/42* (2013.01); *C02F 2303/04* (2013.01)

(58) Field of Classification Search
CPC ...... C02F 1/688; C02F 1/001; C02F 2103/42; C02F 2303/04; B01D 29/333; B01D 2201/291; E04H 4/1218; E04H 4/1281
USPC ......................... 210/167.11, 198.1, 206, 232
See application file for complete search history.

(56) References Cited

U.S. PATENT DOCUMENTS

| | | | | | |
|---|---|---|---|---|---|
| 4,780,197 | A | * | 10/1988 | Schuman | B01D 37/025 210/136 |
| 5,897,770 | A | * | 4/1999 | Hatch | B01D 37/025 422/282 |
| 5,948,248 | A | * | 9/1999 | Brown | B01D 27/08 210/167.3 |
| 6,004,458 | A | * | 12/1999 | Davidson | C02F 1/003 210/453 |

(Continued)

*Primary Examiner* — Fred Prince
(74) *Attorney, Agent, or Firm* — Patterson Thuente Pedersen, P.A.

(57) ABSTRACT

A swimming pool filter element capable of automatically dosing. The swimming pool filter element includes a folding filter element and a doser filter element. The folding filter element includes a filter membrane and end covers, the end covers each having an upper end cover and a lower end cover. A wrench cover is arranged at the upper end of the upper end cover. The doser filter element includes a doser end cover, a doser lining and a doser shell. The doser filter element is added into the folding filter element, so that a water flow needing to be filtered firstly passes through the filter membrane of the folding filter element, solid large-particle impurities are filtered out, then the water flow enters the doser filter element and makes contact with sterilization tablets placed in the doser filter element, the tablets are dissolved, and finally water with dissolved tablets is discharged into a swimming pool.

5 Claims, 5 Drawing Sheets

(56) References Cited

U.S. PATENT DOCUMENTS

| | | | |
|---|---|---|---|
| 6,760,931 B1* | 7/2004 | Mattson, Jr. | A61H 33/6063 |
| | | | 4/504 |
| 2004/0055939 A1* | 3/2004 | Wybo | B01D 29/07 |
| | | | 210/338 |
| 2004/0108262 A1* | 6/2004 | Brandreth, III | B01D 37/025 |
| | | | 210/206 |
| 2005/0139535 A1* | 6/2005 | King | C02F 1/004 |
| | | | 210/501 |
| 2007/0108115 A1* | 5/2007 | Cline | B01D 37/025 |
| | | | 210/206 |
| 2012/0074052 A1* | 3/2012 | Brandreth | B01F 21/22 |
| | | | 210/206 |

* cited by examiner

SWIMMING POOL FILTER INCLUDING AN ANTI-PATHOGENIC DOSING ELEMENT CAPABLE OF AUTOMATICALLY DOSING

RELATED APPLICATION

The present application claims priority to Chinese Application No. 202011172603.1 filed Oct. 28, 2020, which is hereby incorporated herein in its entirety by reference, including the English translation thereof.

TECHNICAL FIELD

The present disclosure relates to swimming pool filter elements, and in particular to a swimming pool filter element capable of automatically providing a dose of antibacterial or like media to the pool water.

BACKGROUND

Filter elements can comprise special equipment in the filtering industry and in particular can comprise purification equipment for purifying connate fluid resource media. Existing filter elements are mainly applied to the filtering of liquid such as oil and water, and the filtering of air. A filter element can remove solid particles in a fluid so as to protect normal operation of equipment and facilitate cleanliness of the fluid. After the fluid enters the filter element, impurities in the fluid are blocked, and the filtered clean fluid flows out through the filter element, so that the fluid is purified to a certain extent. The filter elements commonly used in swimming pools at present often include paper folded filter elements, and in use, the filter elements have the effect of intercepting hair, leaves and large solid particles. However, microorganisms and like pathogens in the water are not necessarily trapped or killed by the filter, and remain as a threat to human users of the pool. Therefore, designing a swimming pool filter element capable of automatically dosing against microorganisms and like pathogens becomes a technical problem to be solved urgently by those skilled in the art.

SUMMARY

A swimming pool filter element capable of automatically dosing against microorganisms and like pathogens is provided.

The swimming pool filter element hereof is capable of automatically dosing against microorganisms and like pathogens, and include a folding filter element and a doser filter element, the folding filter element comprising a filter membrane and end covers. The folding filter element can be a paper folding structure, and the end covers can comprise an upper end cover and a lower end cover, the upper end cover and the lower end cover being bonded to the filter membrane by hot melt welding. A wrench cover is arranged at the upper end of the upper end cover. The doser filter element can comprise a doser end cover, a doser lining and a doser shell. Flanges can be arranged on the doser end cover, in threaded connection with the doser lining. The doser lining can be cylindrical. A plurality of groups of water inlet holes and convex flanges are arranged on the surface. The doser shell can be arranged on the outer side of the doser lining, and a plurality of groups of through holes matched with the water inlet holes and grooves matched with the convex flanges are formed in the surface of the doser shell.

Preferably, the upper end cover and the lower end cover are of disc-shaped structures with a center hole.

Preferably, rectangular notches are formed beside the center hole of the upper end cover, a step is annularly arranged on the periphery of the upper end cover, and a lug boss is arranged between the step and the center hole.

Preferably, the wrench cover can be a disc-shaped structure, the center of the wrench cover being provided with an annular lug boss and convex flanges, and the outer side of the wrench cover can be provided with a locking handle.

Preferably, L-shaped grooves are formed in the annular lug boss.

The swimming pool filter element hereof has the beneficial effect of the doser filter element being added into the folding filter element, so that a water flow to be filtered firstly passes through the filter membrane of the folding filter element, solid large-particle impurities are filtered out, then the water flow enters the doser filter element and makes contact with sterilization tablets placed in the doser filter element. The tablets are dissolved to form a liquid anti-pathogenic dose, and finally the liquid dose is discharged into a swimming pool, so that bacteria and other pathogens in the swimming pool are killed, and a human users of the pool are protected against being harmed by the bacteria and like pathogens.

Figure 1:
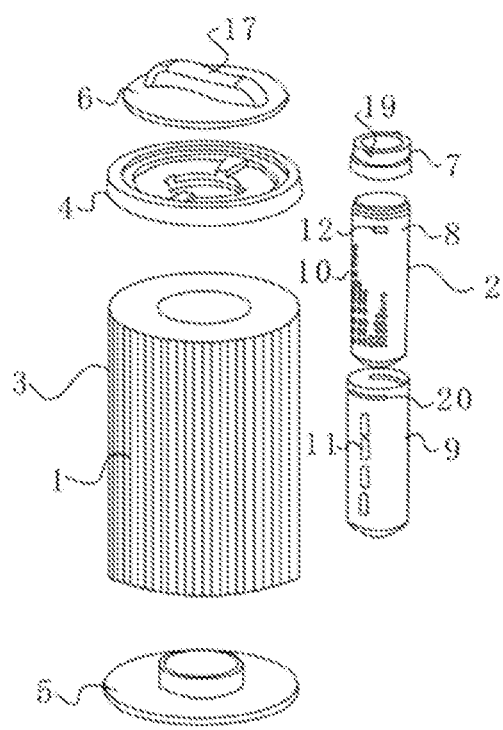
FIG. 1 is an exploded view of an embodiment of the present disclosure.
Figure 2:
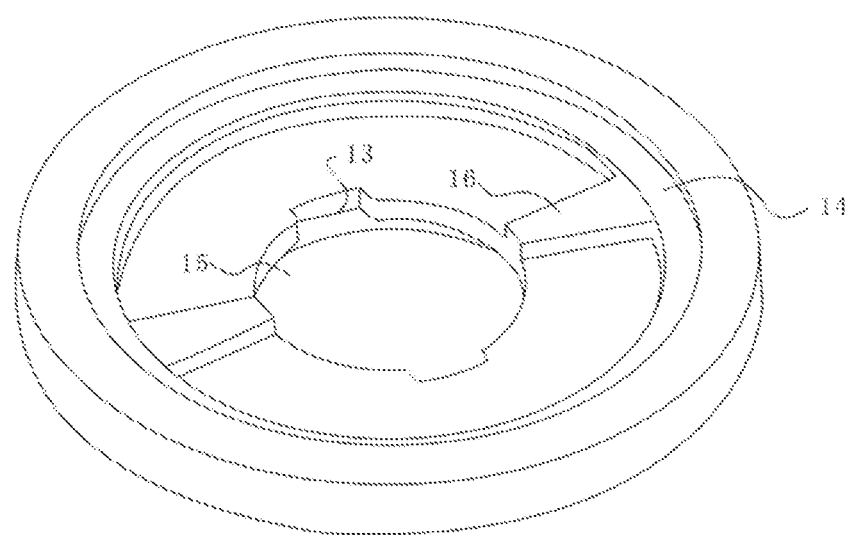
FIG. 2 is a perspective view of an upper end cover of an embodiment of the present disclosure.
Figure 3:
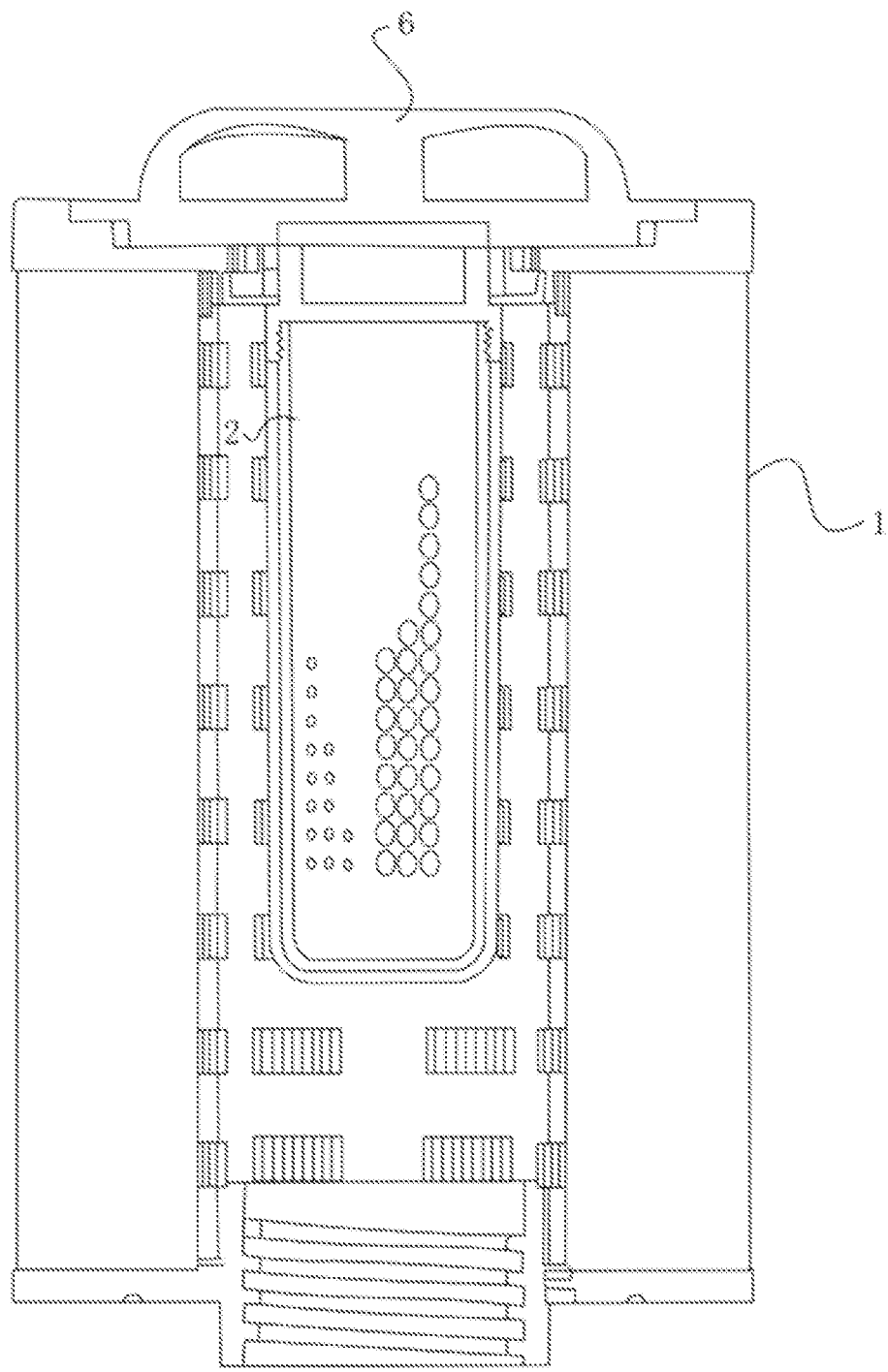
FIG. 3 depicts the internal structure of an embodiment of the present disclosure.
Figure 4:
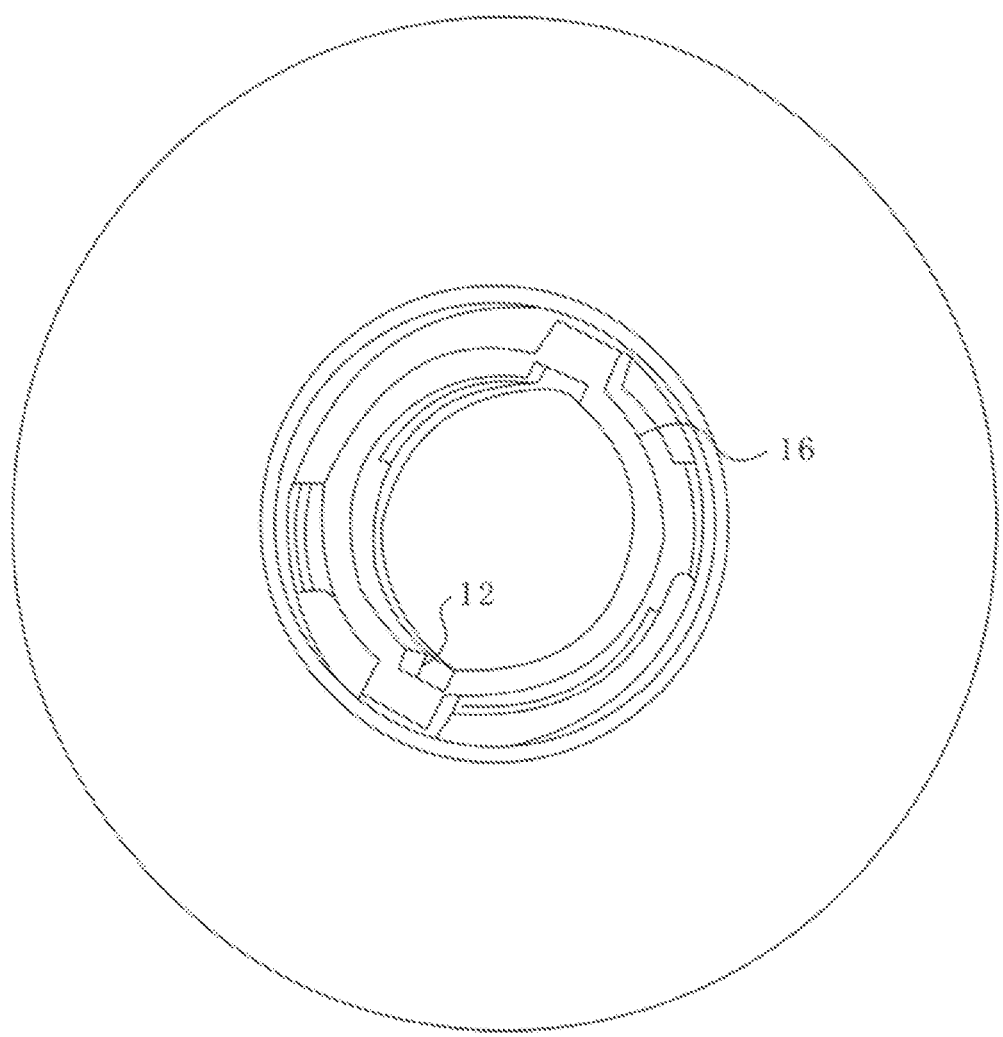
FIG. 4 is a perspective view depicting the convex flanges and an annular lug boss in an embodiment of the present disclosure.
Figure 5:
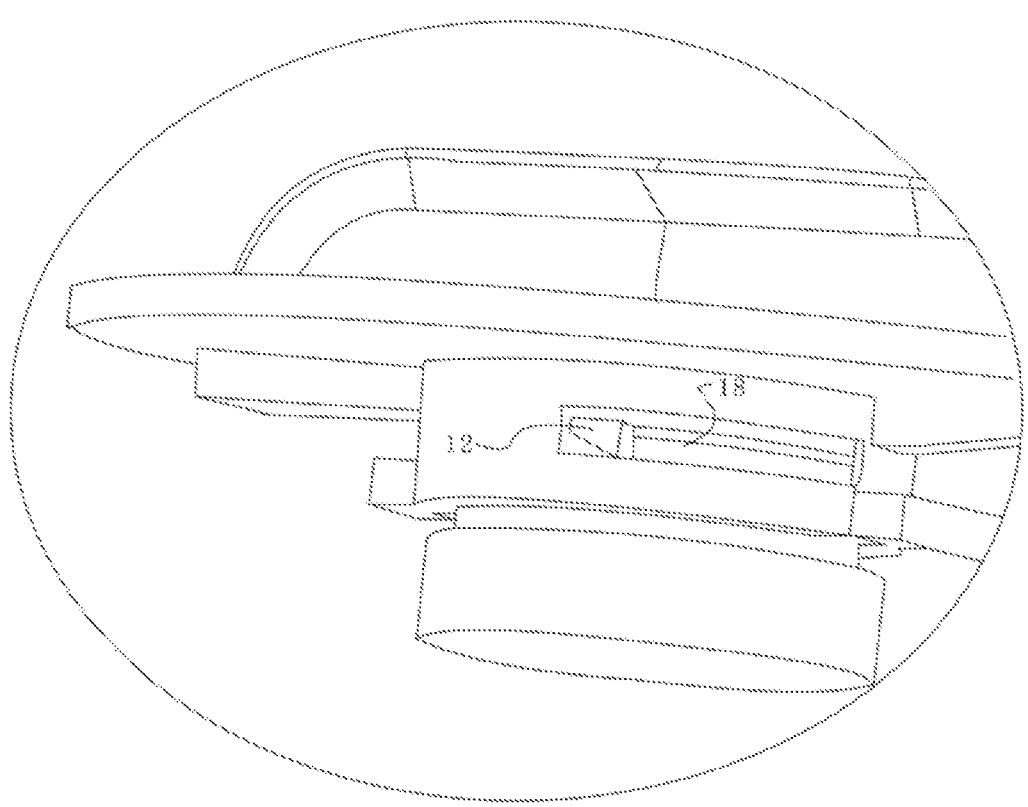
FIG. 5 is a perspective view depicting the convex flanges and L-shaped grooves an embodiment of the present disclosure.
Figure 6:
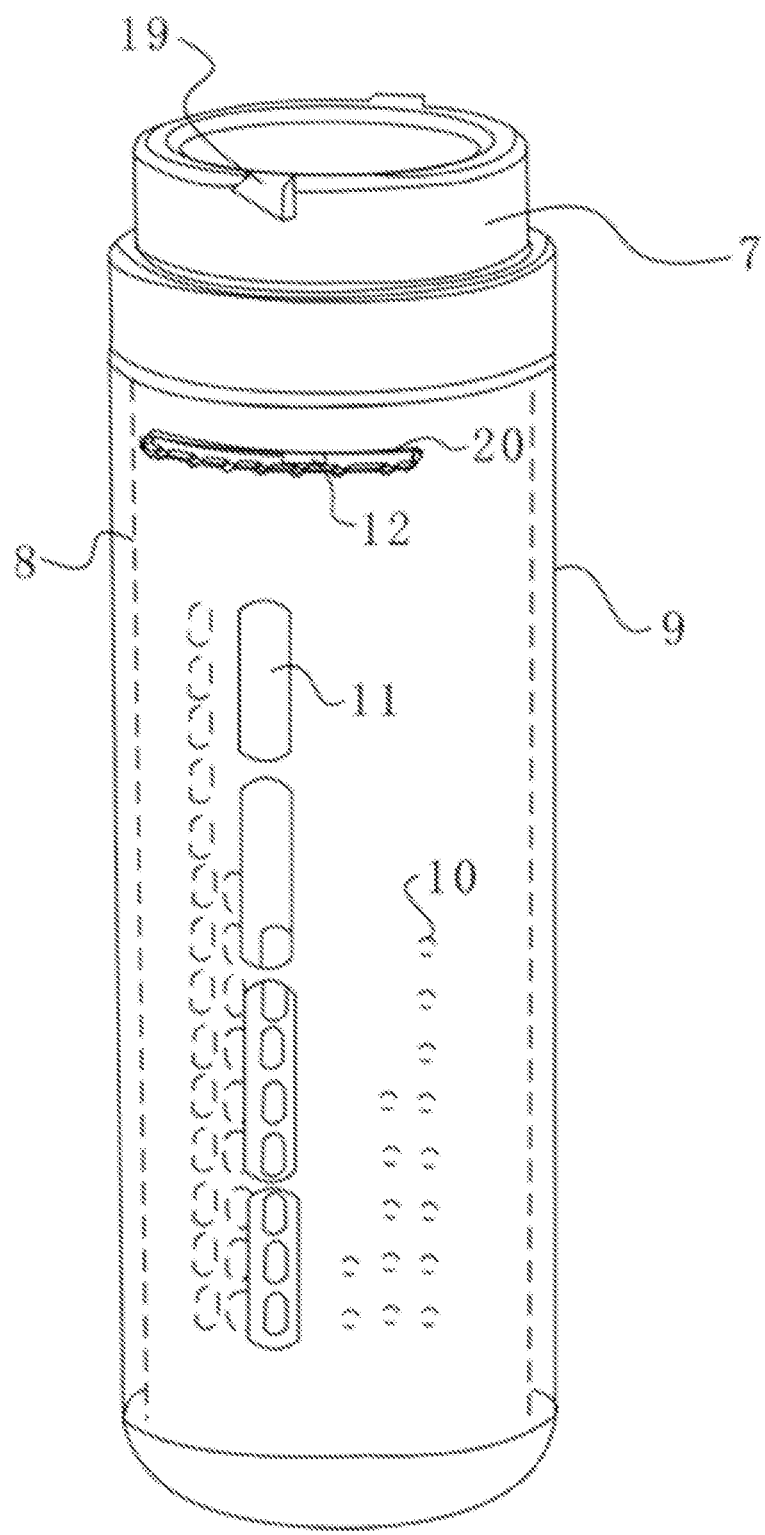
FIG. 6 is a perspective, cut away view of a doser filter element in an embodiment of the present disclosure.

Reference signs: 1, folding filter element; 2, doser filter element; 3, filter membrane; 4, upper end cover; 5, lower end cover; 6, wrench cover; 7, doser end cover; 8, doser lining; 9, doser shell; 10, water inlet hole; 11, through hole; 12, convex flange; 13, rectangular notch; 13, step; 15, center hole; 16, annular lug boss; 17, locking handle; 18, L-shaped groove; 19, flange; and 20, groove.

DETAILED DESCRIPTION

For the purpose that those skilled in the art understand the technical scheme of the present disclosure better, the following further illustrates the present disclosure with reference to the attached figures and preferred embodiments.

As shown in the figures, the present disclosure provides a swimming pool filter element capable of automatically dosing. The swimming pool filter element comprises a folding filter element 1 and a doser filter element 2, the folding filter element 1 comprising a filter membrane 3 and end covers, the folding filter element 1 being a paper folding structure, the end covers comprising an upper end cover 4 and a lower end cover 5, the upper end cover 4 and the lower end cover 5 being bonded to the filter membrane 3 by hot melt welding, a wrench cover 6 being arranged at the upper end of the upper end cover 5, the doser filter element 2 comprising a doser end cover 7, a doser lining 8 and a doser shell 9, flanges 19 being arranged on the doser end cover 7 and being in threaded connection with the doser lining 8, the doser lining 8 being cylindrical, sterilization tablets being placed in the doser filter element 2, a plurality of groups of water inlet holes 10 and convex flanges 12 being arranged on the surface, the doser shell 9 being arranged on the outer side of the doser filter element 2, a plurality of groups of through holes 11 being matched with the water inlet holes 10 and grooves 20 being matched with the convex flanges 12 being formed in the surface of the doser shell 9, the convex flange 12 of the doser lining 8 being used for matching with the grooves 20 of the doser shell 9 so as to achieve position positioning of the doser shell 9, and under the combined action of the water inlet holes 10 and 11, the water outlet area is changed, and the release of dosage is controlled.

The working principle of the swimming pool filter element is that a water flow needing to be filtered firstly passes through the filter membrane 3 of the folding filter element 1, solid large-particle impurities are filtered out, then the water flow enters the doser filter element 2 and makes contact with the sterilization tablets placed in the doser filter element 2, the tablets are dissolved to form a liquid anti-pathogenic dose, and finally the liquid dose is discharged into a swimming pool, so that bacteria in the swimming pool are killed, and a human body is prevented from being damaged by the bacteria.

According to an embodiment, preferably, the upper end cover and the lower end cover are of disc-shaped structures 15 with a center hole.

According to an embodiment, preferably, rectangular notches 13 are formed beside the center hole of the upper end cover 4, a step 14 is annularly arranged on the periphery of the upper end cover, and a lug boss 16 is arranged between the step 14 and the center hole 15.

According to an embodiment, preferably, the wrench cover 6 is of a disc-shaped structure, the center of the wrench cover 6 is provided with an annular lug boss 16 and convex flanges 12, and the outer side of the wrench cover 6 is provided with a locking handle 17. The annular boss 16 is attached to the boundary of the lug boss 16 of the upper end cover 4, positioning of the wrench cover 6 is guaranteed, after the convex flanges 12 are screwed into the rectangular notches 13, the wrench cover 6 is locked and positioned, and when a handle cover is installed on the locking handle 17, rotating force is applied with fingers.

According to an embodiment, preferably, L-shaped grooves 18 are formed in the annular lug boss 16 and are used for the flanges 19 of the upper end cover 4 to be embedded.

The swimming pool filter element has the beneficial effects that the doser filter element is added into the folding filter element 1, so that a water flow needing to be filtered firstly passes through the filter membrane 3 of the folding filter element 1, solid large-particle impurities are filtered out, then the water flow enters the doser filter element 2 and makes contact with sterilization tablets placed in the doser filter element 2, the tablets dissolve to form a liquid anti-pathogenic dose, and finally the liquid dose is discharged into a swimming pool, so that bacteria in the swimming pool are killed, and a human body is prevented from being damaged by the bacteria.

The foregoing descriptions are merely example implementations of the present disclosure. It should be noted that a person of ordinary skill in the art may make several improvements or polishing without departing from the principle of the present disclosure and the improvements or polishing shall fall within the protection scope of the present disclosure.

The invention claimed is:

1. A swimming pool filter element capable of automatically dosing, comprising a folding filter element and a doser filter element, wherein the folding filter element comprises a filter membrane and end covers, the folding filter element is of a paper folding structure, the end covers comprise an upper end cover and a lower end cover, the upper end cover and the lower end cover are bonded to the filter membrane by hot melt welding, a wrench cover is arranged at the upper end of the upper end cover, the doser filter element comprises a doser end cover, a doser lining and a doser shell, flanges are arranged on the doser end cover and are in threaded connection with the doser lining, the doser lining is cylindrical, a plurality of groups of water inlet holes and convex flanges are arranged on the surface of the doser lining, the doser shell is arranged on the outer side of the doser lining, and a plurality of groups of through holes matched with the water inlet holes and grooves matched with the convex flanges are formed in the surface of the doser shell.

2. The swimming pool filter element capable of automatically dosing according to claim 1, wherein the upper end cover and the lower end cover are of disc-shaped structures with a center hole.

3. The swimming pool filter element capable of automatically dosing according to claim 2, wherein rectangular notches are formed beside the center hole of the upper end cover, a step is annularly arranged on the periphery of the upper end cover, and a lug boss is arranged between the step and the center hole.

4. The swimming pool filter element capable of automatically dosing according to claim 3, wherein the wrench cover is of a disc-shaped structure, the center of the wrench cover is provided with an annular lug boss and convex flanges, and the outer side of the wrench cover is provided with a locking handle.

5. The swimming pool filter element capable of automatically dosing according to claim 4, wherein L-shaped grooves are formed in the annular lug boss.

\* \* \* \* \*